Jan. 24, 1967  G. R. RIGBY  3,299,600
SPALLING-RESISTANT REFRACTORY BRICK
Filed Jan. 13, 1964  2 Sheets-Sheet 1
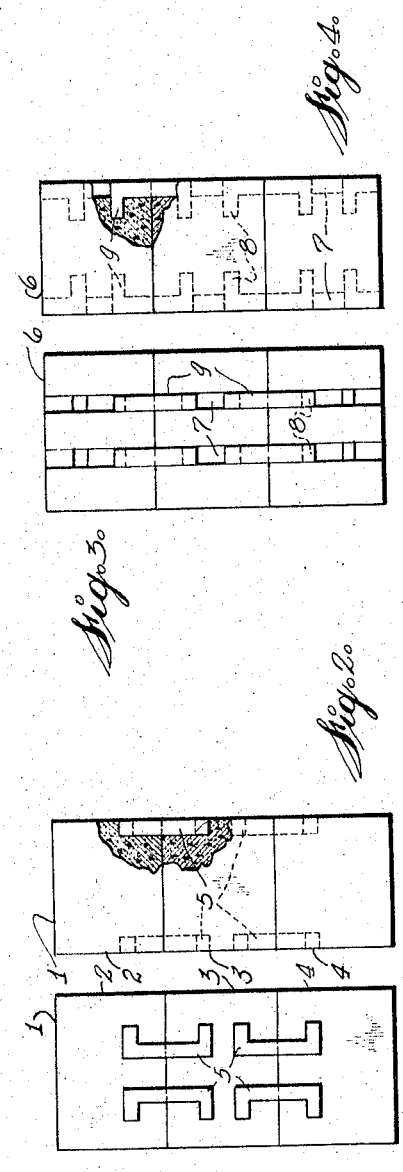
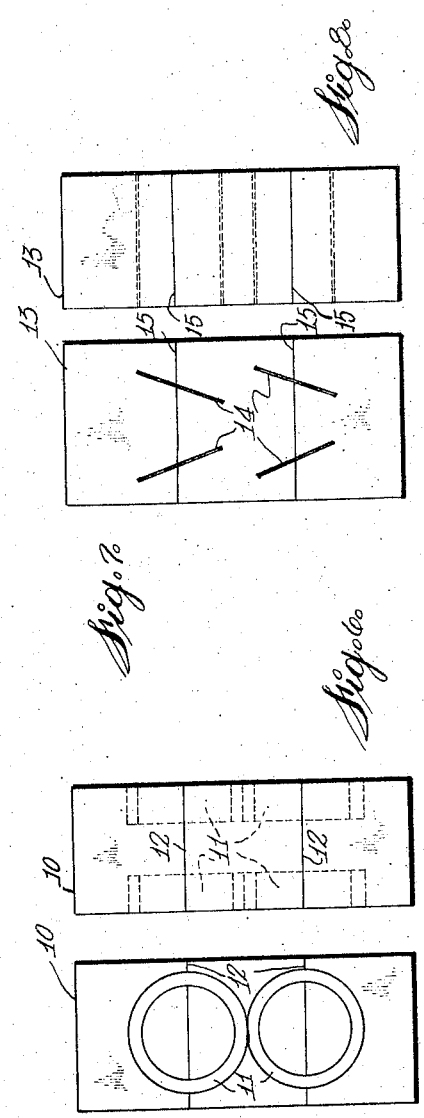
INVENTOR
George R. Rigby
BY
Weir, Marshall, MacRae & Lamb
PATENT AGENT Jan. 24, 1967  G. R. RIGBY  3,299,600
SPALLING-RESISTANT REFRACTORY BRICK
Filed Jan. 13, 1964  2 Sheets-Sheet 2
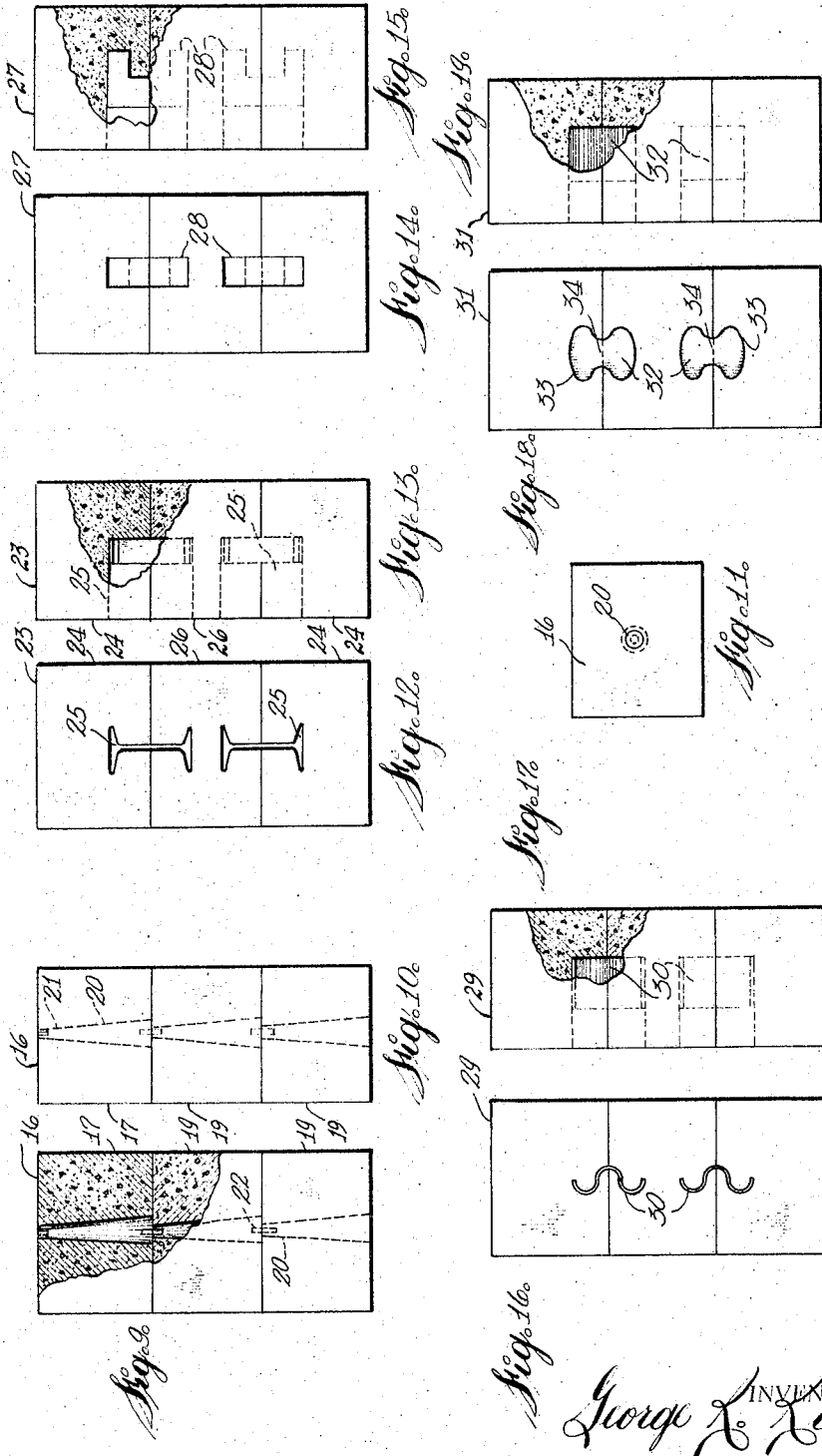
INVENTOR
George R. Rigby
BY
Weir, Marshall, MacRae & Lamb
PATENT AGENT

3,299,600
SPALLING-RESISTANT REFRACTORY BRICK
George R. Rigby, Lachute, Quebec, Canada, assignor to Canadian Refractories Limited, Montreal, Quebec, Canada
Filed Jan. 13, 1964, Ser. No. 337,437
9 Claims. (Cl. 52—596)

This application is a continuation-in-part of application Serial Number 32,862, filed May 31, 1960 (now abandoned). This invention relates to refractory brick for furnace roofs and the like, of exceptional resistance to thermal shock and to the penetration and migration of liquid.

Although basic brick have been increasingly used in recent years in both ferrous and non-ferrous metallurgical industries, the rate of increase has been much slower than might have been expected from the greatly superior refractoriness and resistance to the action of basic slags of this type of refractory. One of the major reasons for the limited use of basic refractories in furnace roofs, rotary kilns, and other applications in which thermal stresses are developed, has been the relatively poor resistance to thermal spalling and to shelling or slabbing shown by basic brick, particularly those of magnesite.

When refractory brick are rapidly heated and subsequently rapidly cooled, the resulting volume changes create stresses which may result in the development of cracks, with the loss of corners of the brick or the whole of the heated face.

In service, there is frequently migration or interior travel of liquid back from the face until it solidifies, thereby changing the coefficient of expansion, thermal conductivity and strength. Such migration may be of original brick constituents, as when lime and silica occur in roughly equimolecular proportions in a magnesite brick; low-melting monticellite ($CaO.MgO.SiO_2$) may then form and travel back from the face until it solidifies, when there is formed a zone of low refractoriness roughly parallel to the heated face of the brick. If, on the other hand, during the operation of an open hearth furnace, slag high in lime penetrates a magnesite brick, it may move back and react with silica already present and form a zone high in dicalcium silicate ($2CaO.SiO_2$). Again, when the fume in an open hearth furnace penetrates the roof, zoning likewise results. The formation of any zone of different composition from that of the original refractory may, as the temperature rises and falls, cause the loss of the brick face over large sections of the roof. Such losses are frequently repeated, until complete replacement of the roof is necessary.

In rotary kilns for the burning of portland cement, magnesite, etc., a similar sequence of events may occur, and any major change in composition in a narrow zone parallel to the heated face may result in serious spalling and slabbing, and even compel an immediate cessation of operations.

It is the object of this invention to overcome the above difficulties by providing refractory brick, especially those of basic and neutral character, which are sufficiently resistant to thermal spalling and slabbing to permit their more general use and the more complete realization of their exceptional advantages. This is effected by the provision of transverse barriers to the migration of mobile materials into the brick, barriers of such a character as also to permit some lateral movement, during heating and cooling, and thereby inhibit the development of such stresses as cause cracking and spalling.

It has been found that the particular location of these transverse barriers in the brick structure is of primary importance in achieving the purpose of the invention. Each barrier must not be removed from the hot face of the brick by more than four nor less than two inches and each section of the brick effected by a barrier must be less than one half the length of the brick. In other words, there must be at least two barriers as provided by at least three sections in each brick. It will be apparent that if a section of the brick effected by a barrier were more than one-half the length of the brick, the major portion of the brick would be unprotected against migration of mobile materials and thus no significant advantage would be achieved. The particular distance between a barrier and the face of a section exposed directly to furnace temperature, within the range given, depends upon the composition of the refractory material of which the brick is made. For example, length of a section below a transverse barrier is less for chrome-magnesite material than for magnesite material. If the transverse barrier closest to the hot face is too far removed from the exposed hot face the stresses set up by heating and cooling of the refractory material used, in the zone of solidification of the migrating liquids, will cause the brick section to crack and break off at this point. This results in shortened useful life of the brick. The transverse barriers may be more closely spaced near the hot face of the brick. When the transverse barrier is located as described this cracking and spalling of the brick is greatly reduced or eliminated.

The application of the invention to the manufacture of basic and neutral brick, such as magnesite, chrome ore and mixtures, thereof, has been stressed because these types of brick are in general more susceptible to spalling at high temperatures than are the more acid silica and silica-alumina brick. However, the principle of the invention can advantageously be applied in the manufacture and use of any type of refractory, acid, basic or neutral, burned or unburned, whenever conditions are such that very high spalling resistance is required, either alone or in combination with other properties, such as high strength and high refractoriness, or when by its adoption substantial economies can be effected.

The use of multiple brick sections at least partially separated by suitable transverse barriers is of particular advantage when it is desired to unite different refractories for the sake of combining their specific properties. Thus in the construction of the sprung roofs of open hearth steel furnaces it is customary to use the highest grades of silica brick, which retain adequate strength almost to their melting point, and which are highly spalling-resistant at operating temperatures. To a limited extent, basic and neutral brick are now used for open hearth roofs, and they are in general much more refractory than silica brick and can be used at substantially higher temperatures, thereby permitting harder driving and the attainment of much higher production rates. Unfortunately, these brick do not normally possess either the high rigidity at elevated temperatures or the excellent spalling resistance which characterize silica brick, hence in large furnaces they almost invarably have to be hung by means of elaborate and expensive suspension systems. Using the principle of this invention, however, it is feasible and highly advantageous to construct a sprung roof of silica brick so made as to permit hanging from it chrome-magnesite brick transversely divided into several sections. This combination provides a strong supporting roof above a highly refractory working roof which not only protects the silica from the extreme heat of the furnace but is itself rendered spalling-resistant through its novel type of construction. The silica portion of the roof will normally be of burned brick, and the chrome-magnesite may obviously be either burned or unburned.

Similarly, in any furnace where such combinations are desirable, spalling-resistant sillimanite brick can be hung from mechanically strong zircon, or, for the sake of economy and for use at extremely high temperatures, a thoria face can be attached to a zirconia brick. Many other combinations are also permissible because of the fact that they together form no low-melting compounds or eutectics, including magnesia-zirconia ($MgO$—$ZrO_2$), zircon-zirconia ($ZrO_2.SiO_2$—$ZrO_2$), chromic oxide-zirconia ($Cr_2O_3$—$ZrO_2$), spinel-alumina $$(MgO.Al_2O_3\text{—}Al_2O_3)$$

and spinel-magnesia ($MgO.Al_2O_3$—$MgO$).

The nature of the invention, and the many forms which it can take in the application of the basic principle enunciated above, can be best understood from the accompanying drawings, in which:

FIGURES 1 and 2 are side and edge elevations respectively of one form of brick in accordance with the invention, FIGURES 3 and 4 are side and edge elevations respectively of another form of brick, FIGURES 5 and 6 are side and edge elevations respectively of still another form of brick, FIGURES 7 and 8 are side and edge elevations respectively of a further brick modification, FIGURES 9, 10, and 11 are side, edge and end elevations, respectively, of still another modification, FIGURES 12 and 13 are side and edge elevations respectively of another modification, FIGURES 14 and 15 are side and edge elevations respectively of another form of brick, FIGURES 16 and 17 are side and edge elevations respectively of another modification, and FIGURES 18 and 19 are side and edge elevations respectively of another modification.

It will be apparent that the brick of the present invention are adapted to be employed as headers, i.e., each brick is adapted to be laid on flat with its longest dimension perpendicular to the face of the wall structure of which it forms a part. Thus, the barriers described extend transversely of the longitudinal axis of the brick.

FIGURES 1 and 2 show brick 1, which is divided into three separate sections, 2, 3 and 4, of substantially the same size. Metal connectors 5, preferably of refractory metal not readily oxidized and bent at right angles at both ends, are laid in corresponding recesses in the refractory ceramic material and serve to attach the three sections together. If desired, plates (not shown) may be cemented or otherwise attached to the broad sides of the brick to retain connectors 5 in position.

FIGS. 3 and 4 show a brick 6 with three sections corresponding to those of FIGS. 1 and 2 except that, for ease of manufacture and use, all sections are alike, each recess 7 being carried continuously through all sections, with depressions 8 for the insertion of metal connectors 9. It will be seen that such a brick can be made of any desired length by the addition of other similar sections; hence, if the sections are three inches long, brick from nine up to eighteen inches or more in length can readily be made. If desired, transverse metal plates may be inserted between the sections, but the planes form adequate migration barriers in most cases, and of course prevent the formation of internal stresses along the planes, because the sections are capable of lateral movement.

FIGS. 5 and 6 show a brick 10, in front and side elevations, with three sections. In this case the sections are attached by means of metal rings 11 which extend across planes 12 and lie in corresponding depressions. No transverse plates are shown, but these can of course be used, if desired.

FIGS. 7 and 8 show another method of attachment of three sections constituting brick 13. Continuous saw cuts are made across planes 15 and these are closely fitted with metal plates 14 which, as in all cases in which brick sections are attached by means of metal connectors, should preferably be of a refractory metal not readily oxidizable. Plates 14 must obviously be inclined to planes 15, or they would provide no positive attachment. In any case the saw cuts must be so orientated with reference to the transverse barriers that the sections are held together. No saw cut may be parallel to the longitudinal axis of the brick.

In FIGS. 9, 10 and 11, brick 16 has three sections, 17, 18 and 19, each of which has a single centrally located tapered pin 20 extending longitudinally through the whole section, with the small end 21 uppermost in order to provide support; if, however, the topmost section 17 is not to be supported from its tapered pin 20, the whole section 17 containing it should be reversed end for end, in order to prevent pin 20 from being pulled out of section 17. Adjacent sections are attached to each other by means of connecting pins 22 which are threaded on both ends and screwed into adjacent ends of tapered pins 20. By such an arrangement, brick can be built up to any desired length.

FIGS. 12 and 13 illustrate the use of a short I-beam section 25a as the centrally located connection between two brick sections. As shown, brick 23 has three sections, of which top and bottom sections 24 have only one recess 25 each, and are interchangeable. Central section 26 has two recesses, and by combining several such sections brick of any desired length can be made.

FIGS. 14 and 15 show a brick 27, which is like brick 23 of FIGS. 12 and 13 except that attachment is made by tie-rod connector 28, also centrally located.

In FIGS. 16 and 17, brick 29 has a centrally located connector 30 shown as a metal plate bent through regular curves, but the only essential condition is that its form be to a substantial extent non-rectilinear, so that when in place it will prevent separation of the sections, any number of other forms than that shown, but embodying the same condition, would work equally well.

FIGS. 18 and 19 show brick 31 with a single refractory ceramic connector 32 between adjacent sections; this must of course be of material chemically compatible with that of brick 31, and must have both ends 33 larger than its central portion 34, in order to provide attachment.

The term section as used in this specification means any portion of a brick which is completely or to a major degree separated or delimited from the remainder of the brick along a transverse plane or other surface of separation, to provide a transverse barrier to migration of mobile liquid in the brick when the latter is in use in high temperatures.

Separately moulded sections, whether burned or unburned, may be put together to form a brick of any desired length. Incompletely divided sections may be attached to separately moulded sections in many useful combinations, or may be comoulded to form brick of full size, for use in the unburned condition. The essential condition in each case is that the refractory material of which the brick is made must be mainly discontinuous longitudinally of the brick, so as to form the transverse barrier to the migration of mobile material and a surface of separation along which lateral movement may take place to inhibit the development of stresses.

Only straight brick have been illustrated with transverse barriers or planes perpendicular to the longitudinal axis of the brick, but, in rotary kilns and furnaces in which arch, wedge and key brick are used, the longitudinal axis is to be taken as the centrally located axis perpendicular to the heated face, and transverse planes are those cutting that axis at an angle of at least 45 degrees.

I claim:

1. A spalling resistant refractory brick having a hot end face, a cold end face, and a longitudinal axis extending from one of said faces to the other and constituting the major dimension of said brick, said brick comprising at least three sections arranged in superposed relation along said axis, said sections being mutually separable and of generally rectangular form, each said section having a first end face and a second end face in opposed relation to said first end face, each said section having its said first end face in melting engagement with said second end face of an adjoining one of said sections along a planar line of abutment transversely intersecting said axis to provide a barrier to longitudinal migration of mobile material in said brick, the longitudinal dimension of each said section extending from said line of abutment being not more than four nor less than two inches and less than one-half the length of said brick, said second end face of one of said sections being plane and uninterrupted, each of said meeting end faces having a recess therein, a pair of said recesses of adjoining ones of said sections being in communication across said line of abutment, and means holding said sections together comprising an independent member seated in each said communicating pair of recesses and having end portions in each of said pair of recesses preventing longitudinal displacement of said sections.

2. A spalling resistant refractory brick having a hot end face, a cold end face, and a longitudinal axis extending from one of said faces to the other and constituting the major dimension of said brick, said brick comprising at least three sections arranged in superposed relation along a longitudinal axis, said sections being mutually separable and of generally rectangular form, each said section having a first end face and a second end face in opposed relation to said first end face, each said section having its said first end face in meeting engagement with said second end face of an adjoining one of said sections along a planar line of abutment transversely intersecting said brick to provide a barrier to longitudinal migration of mobile material in said brick, the longitudinal dimension of each said section extending from said line of abutment being not more than four nor less than two inches and less than one-half the length of said brick, said second end face of one of said sections being plane and uninterrupted, each of said meeting end faces having a recess therein, a pair of said recesses of adjoining ones of said sections being in communication across said line of abutment, and means holding said sections together comprising an independent member seated in each said communicating pair of recesses and having end portions in each of said pair of recesses, each of said end portions being angularly disposed relative to said longitudinal axis to prevent longitudinal displacement of said sections.

3. A spalling-resistant refractory brick as defined in claim 1, each said independent holding member intersects the longitudinal axis of said brick.

4. A spalling-resistant refractory brick as defined in claim 1, each said independent holding member being of metal less oxidizable than iron.

5. A spalling-resistant refractory brick as defined in claim 4, each said holding member comprising a rod having an intermediate portion, said end portions thereof being at right angles to said intermediate portion.

6. A spalling-resistant refractory brick as defined in claim 1, each said pair of recesses having straight parallel side walls from end to end thereof, said side walls being angularly disposed relative to the longitudinal axis of said brick, and each said holding member comprising a straight metal member.

7. A spalling-resistant refractory brick as defined in claim 3, each said pair of recesses having undulating side walls, and each said holding member being of corrugated form for disposition between said undulating side walls.

8. A spalling-resistant refractory brick as defined in claim 1, each said holding member being composed of ceramic refractory material.

9. A spalling-resistant refractory brick as defined in claim 3, each said holding member being composed of ceramic refractory material and having an intermediate portion of lesser cross-sectional area than each of said end portions.

References Cited by the Examiner
UNITED STATES PATENTS

| | | | |
|---|---|---|---|
| 905,189 | 12/1908 | Hyke | 52—582 |
| 1,295,919 | 3/1919 | Muhlhausen | 52—586 |
| 1,410,729 | 3/1922 | Balz | 52—598 |
| 1,649,481 | 11/1927 | McWane | 52—410 |
| 1,848,737 | 3/1932 | Matthews | 110—99 |
| 2,235,356 | 3/1941 | Byers | 52—584 |
| 2,476,433 | 7/1949 | Shinn | 52—612 X |
| 2,744,479 | 5/1956 | Hartle | 52—585 X |
| 2,776,631 | 1/1957 | Reintjes | 110—99 X |
| 2,908,157 | 10/1959 | Bliss et al. | 52—612 X |
| 3,134,199 | 5/1964 | Scheffer | 52—612 |

FRANK L. ABBOTT, *Primary Examiner.*

A. C. PERHAM, *Assistant Examiner.*